INVENTORS
GEORGE E. ANSELL
KENNETH R. BULLOCK
SAMSON SORTLAND

THEIR AGENT

April 16, 1963 G. E. ANSELL ETAL 3,085,388
COMPOUND APPLICATOR FOR CABLE CORE
Filed April 24, 1961 2 Sheets-Sheet 2

*INVENTORS*
GEORGE E. ANSELL
KENNETH R. BULLOCK
SAMSON SORTLAND
BY  V. F. Voek

*THEIR AGENT*

United States Patent Office 3,085,388
Patented Apr. 16, 1963

3,085,388
COMPOUND APPLICATOR FOR CABLE CORE
George E. Ansell, Yorktown Heights, and Kenneth R. Bullock and Samson Sortland, Dobbs Ferry, N.Y., assignors to Anaconda Wire and Cable Company, a corporation of Delaware
Filed Apr. 24, 1961, Ser. No. 105,127
4 Claims. (Cl. 57—7)

Our invention relates to apparatus for applying filler compound to a cable core and particularly to apparatus for applying such compound during a cabling operation.

In the manufacture of cable it is often necessary to fill the cores with a compound that will exclude moisture and render them vapor-tight. This is necessary for example, for electric cables which are expected to pass through water-tight bulkheads. Such cables include electrical conductors made up of a number of smaller wires stranded together. A common configuration for an electrical conductor is to have one solid wire in the center of six other wires of the same size concentrically spiralled around it. A single cable may consist of a large number of insulated conductors, each conductor strand being made up of seven individual wires, six around one. When such a cable is passed through a bulkhead it is usually rendered leak proof by means of a suitable packing gland so long as the cable is unbroken but unless each conductor strand is filled with a sealing compound the bulkhead will not be secure against leakage should there be a failure of the sheath of the cable. It is not practicable to seal a cable strand after it has been formed because of the pastiness and high viscosity of suitable compound materials. When six wires are wrapped around one, the wires are in continuous line-contact with each other and this contact blocks entry to the triangular area between the wires, which the compound must enter to form an effective seal. It has been suggested that the center wire might be covered with compound to the proper depth to fill the interstices formed by the six overlying wires during the cabling operation, but known apparatus has not been able to accomplish this feat in a commercially practicable manner. The difficulty here has been that cabling machines do not permit ready access to the center core at a point near the cable-forming die because of the other wires that are rotating around it and it is not feasible to apply the compound to the center strand at a point prior to its entering the cabler because any compound soft enough to deform into the interstices as required will be scraped off the center wire at the various guide points in the cabler before it reaches the cabling die.

We have overcome these difficulties with a novel apparatus which can fit up close to the forming die and rotate with the outer strands which are free to pass right through it. We have invented apparatus for applying filler material to a cable core being stranded comprising a container for the filler material that is rotatable about the axis of the core. Our container has a first orifice for the entry of the core, a second orifice for the egress of the core so that the core comes in contact with the filler material in the container. Our apparatus comprises a stationary closure in slidable engagement with the container, and the closure includes an entry port for feeding filler material into the container. There are a plurality of passageways through the container of our apparatus for strands being overlaid on the cable core. In a preferred embodiment our apparatus is comprised of a tubular element and a hollow disk projecting radially from and communicating with the tubular element. The disk comprises a forward and a rearward plate and there is an annular closure between and in slidable engagement with the plates. The closure has an entry port for the filler material and the forward and rearward plates have matching apertures that are joined by a plurality of tubes between the plates. The filler material is preferably forced into our apparatus under pressure. We also provide means for rotating the container of our apparatus and have provided our apparatus with a doctor blade across the seam between the container and closure thereof said blade being in fixed relation to the closure.

A more thorough understanding of our invention may be obtained from the appended drawing; in the drawing.

Figure 1:
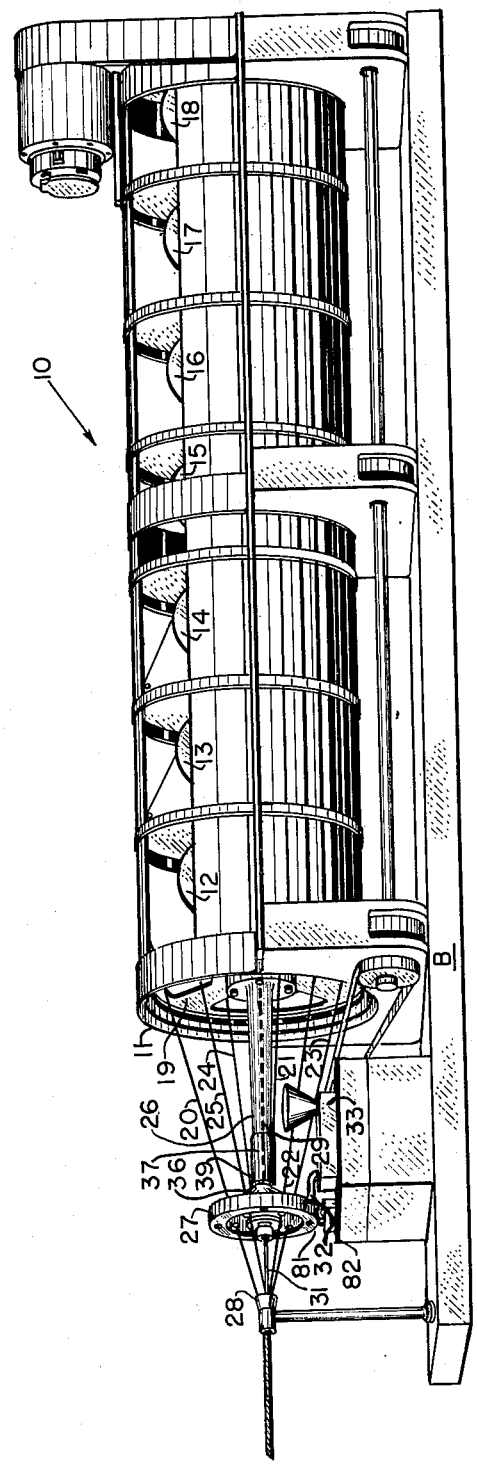
FIG. 1 is a side elevation of a strander employing the apparatus of our invention.

Referring to FIG. 1 a tubular strander of known construction is shown generally at 10 mounted on a fixed base B. The strander 10 has a rotating barrel 11 within which are mounted some plurality of reels 12–18. Although we have shown a strander for a seven-strand cable capable of holding the seven wire reels 12–18 it will be understood that our apparatus is not limited to seven-reel stranders but can be employed with stranders for a lesser or greater number of wires. The barrel 11 has a face plate 19 rotating therewith through which wires 20, 21, 22, 23, 24, 25 coming respectively from the reels 13–18 are passed in a conical configuration about a hollow projection 26 extending from the center of the plate 19 and rigidly affixed thereto. The wires 20–25 pass through an applicator 27 into a forming die 28 and are caused to rotate by reason of the rotation of the plate 19 through which they pass, and also by reason of the rotation of the barrel 11 along which they travel before they reach the plate 19. However there is a center wire 29 from the first reel 12 which passes directly through the center of the plate 19 and the projection 26 into an orifice 30 in the applicator 27 where it is coated with filler compound 31. From a consideration of FIG. 1 it will be evident that the wire 29 is nowhere exposed in a manner that will permit the application of a coating of filler material by known methods. We have shown a strander in which the reel 12 occupies the first position in the strander so that the center core 29 can be brought out directly through a central opening in the plate 19. It is also known to mount the reel 12 behind the strander 10 which then has a capacity for only six reels. In this case the strand 29 must be carried down the entire length of the barrel 11 and, if it were covered with filler compound at the rear of the strander 10, such compound would inevitably be scraped off before the strand reached the forming die 28. In the apparatus of our invention the center strand 29 receives the coating 31 of filler compound immediately prior to its entering the die 28 so that the wires 20–25 are brought down upon the core 29 while it is still covered with compound 31 and the interstices between the wires are thoroughly filled with compound. A supply of compound is continuously fed into the applicator 27 through a flexible pipe 32 from an extruder 33 fixed to the base B within which pressure can be generated by a worm 34. Additional compound can be supplied as needed into a hopper 34 without any interruption of the stranding operation. The pipe 32 preferably consists of flexible pressure tubing capable of accommodating the vibration of the applicator 27 mounted on the rotating projection 26.

Figure 2:
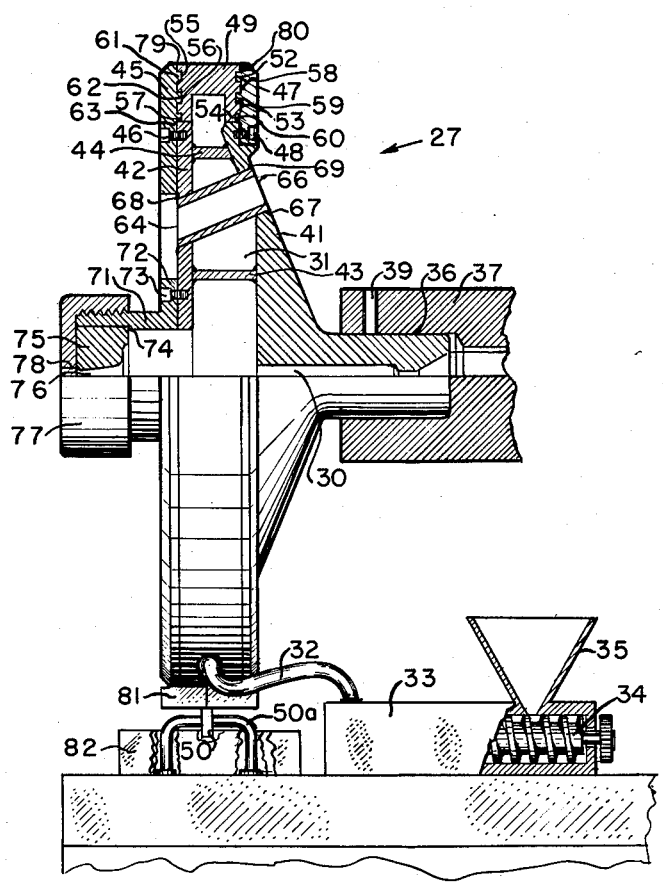
FIG. 2 is a partially sectionalized side elevation of an embodiment of our invention.
Figure 3:
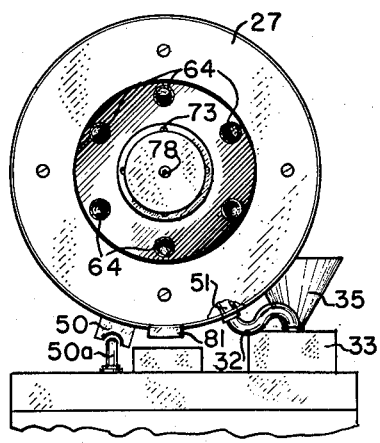
FIG. 3 is a front elevation of the embodiment of FIG. 2.

The applicator 27 is comprised of a tubular portion 36 (FIG. 2). The tubular portion 36 is connected to the hollow projection 26 by means of a collar 37 and set screws 38, 39 so that it is caused to rotate along with the plate 19 and the barrel 11. The tube 36 terminates in a flange or plate 41 extending radially therefrom and faced by an opposing flange or plate 42 of equal diameter. The plates 41, 42 together comprise a hollow disk which can be filled with the compound 31. The plates 41, 42 are held in fixed relation by means of an inner series of spacer bars 43 welded at equally spaced points around the disk and an outer series of spacer bars 44, also welded, to provide great rigidity to the disk formed of the plates 41, 42. A ring plate 45 is bolted to the plate 42 by means of a series of cap screws 46 and a matching ring plate 47 is bolted to the plate 41 with cap screws 48. An annular closure 49 is fitted between the ring plates 45 and 47 and over the edges of the plates 41, 42 in sliding engagement therewith. A slotted plate 50 projects downwardly from the closure 49 and engages a U-shaped stop 50a rigidly fixed to the base B. By this means the closure 49 is prevented from rotating along with the other elements of the applicator 27 but is free to accommodate any vibration of the rotating projection 26. Alternatively the closure 49 may be rigidly mounted to the base B and a flexible coupling substituted for the collar 37. The closure 49 is drilled and threaded to form a tap 51 to receive the threaded end of the pipe 32 for introducing the compound 31 under pressure. Due to the pressure generated by the extruder 33 and due to the centrifugal force generated by the rotation of the plates 41, 42 the compound 31 tends to be forced out between the plates 41, 42 and the closure 49. For this reason we prefer to cut concentric grooves 52, 53, 54 in the surface of the closure 49 facing the ring plate 47 and concentric grooves 55, 56, 57 in the surface of the closure 49 facing the ring plate 45 and to provide the ring plate 47 with concentric projections 58, 59, 60 fitting respectively the grooves 52, 53, 54 and to provide the ring plate 45 with concentric projections 61, 62, 63 fitting respectively the grooves 55, 56, 57. The plate 42 is pierced by six holes 64 spaced 60 degrees apart and the plate 41 is pierced by six matching holes 66 also equally spaced but at a greater radial distance from the center of the disk. Six short tubes 67 form passageways between the hole in the plate 42 with the matching holes in the plate 41. Connection between the tubes 67 and the holes are rendered leak proof by welds 68 and 69 on each of the tubes. The tubes 67 provide passageways for the wires 20–25 which are rotating with the tube 36 and the barrel 11 through the plates 41, 42 which are also rotating. A threaded cylinder 71 with an annular shoulder 72 is bolted to the plate 42 by means of a plurality of cap screws 73, the inside wall of the cylinder 71 is offset at 74 to receive a die 75 with an aperture 76 having a diameter exceeding the diameter of the core wire 29 but enough to leave the desired quantity of the compound 31 on the core wire as it leaves the applicator 27. The die 75 is locked into the cylinder 71 by means of a threaded cap 77 with a central opening 78.

Because of the pressure in the compound 31 generated by the worm 34 and the pressure created by centrifugal force, the compound 31 tends to be squeezed through seams 79, 80 formed between the closure 49 and the ring plates 45, 47. We have found that any material that oozes through the seams 79, 80 can be effectively scraped off by a V-shaped doctor blade 81 fastened as by welding to the closure 49 at the bottom of the applicator 27. The doctor blade 81 extends beyond the seams 79, 80 and comes in scraping contact with the edge surfaces of the ring plates 45, 47, preferably extending slightly beyond said surfaces. A catch bin 82 is conveniently placed under the doctor blade 81 to catch the compound 31 scraped off by the blade 81. Such compound may be returned to the hopper 35. Although we have shown an applicator for applying compound to a core 29 being overlaid with six helically applied wires, we do not wish our invention to be limited to this number and it will be obvious that fewer wires may be applied over the core and that by providing more passageways, such as those provided by the tubes 67, or by bringing more than one strand through each of the said passageways, an additional number of strands of wires may readily be applied over a core covered with filler compound within the scope of our invention.

We have invented a new and useful apparatus for applying filler compound to the cores of cables and during the cabling operation, for which we desire to receive Letters Patent.

We claim:

1. Apparatus for applying filler material to a cable core being overlaid with a plurality of helical strands comprising a container for said filler material, said container being rotatable around the axis of said core and said container defining a first orifice for the entry of said core, a second orifice for the egress of said core, said core being in contact with said filler material in said container, a stationary closure in slidable engagement with said container, said closure defining an entry port for said filler material, and a plurality of sealed passageways through said container for said strands.

2. Apparatus for applying filler material to a cable core being overlaid with a plurality of helical strands comprising a tubular element and a hollow disk projecting radially from said tubular element and communicating with the same whereby said tubular element and said hollow disk comprise a container for said filler material, said tubular element defining constricted orifices for the entry and egress lengthwise thereof of said core, said disk comprising a forward and a rearward plate, an annular closure between and in slidable engagement with said plates, said closure defining an entry port for said filler material, said forward and said rearward plates defining a plurality of matched apertures, and a plurality of tubes each connecting the forward plate around one of said apertures to the rearward plate around said matching aperture.

3. Apparatus for applying filler material under pressure to a cable core being overlaid with a plurality of helical strands rotating around said core comprising a container for said filler material, said container being rotatable around the axis of said core and said container defining a first orifice for the entry of said core, a second orifice for the egress of said core, said core being in contact with said filler material in said container, means for rotating said container at the speed of rotation of said strands, a stationary closure in slidable engagement with said container, said closure defining an entry port for said filler material, and a plurality of sealed passageways through said container for said strands.

4. Apparatus for applying filler material under pressure to a cable core being overlaid with a plurality of helical strands comprising a container for said filler material, said container being rotatable around said core, a stationary closure in slidable engagement with said container, said container and said closure defining an annular seam, and a doctor blade across said seam, said blade being in fixed relation to said closure.

References Cited in the file of this patent
UNITED STATES PATENTS

| | | |
|---|---|---|
| 1,261,317 | Tew | Apr. 2, 1918 |
| 1,317,426 | Brennan | Sept. 30, 1919 |
| 1,420,911 | Davis | June 27, 1922 |
| 1,779,505 | Van Der Jagt | Oct. 28, 1930 |
| 1,950,988 | Luttenberger | Mar. 13, 1934 |